Feb. 6, 1923. 1,444,706.
F. ROSETE.
SINGLE TUBE TIRE.
FILED NOV. 4, 1921.
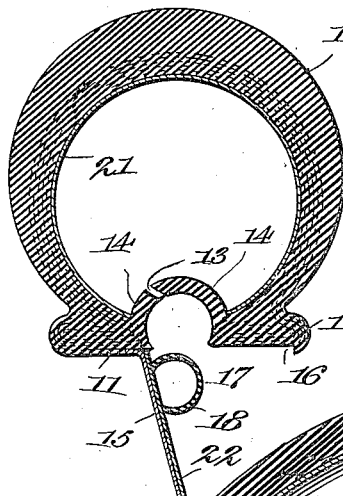
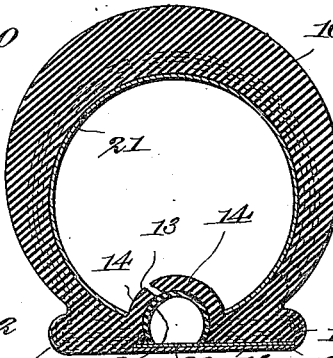
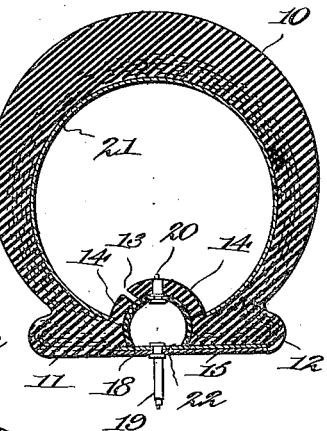
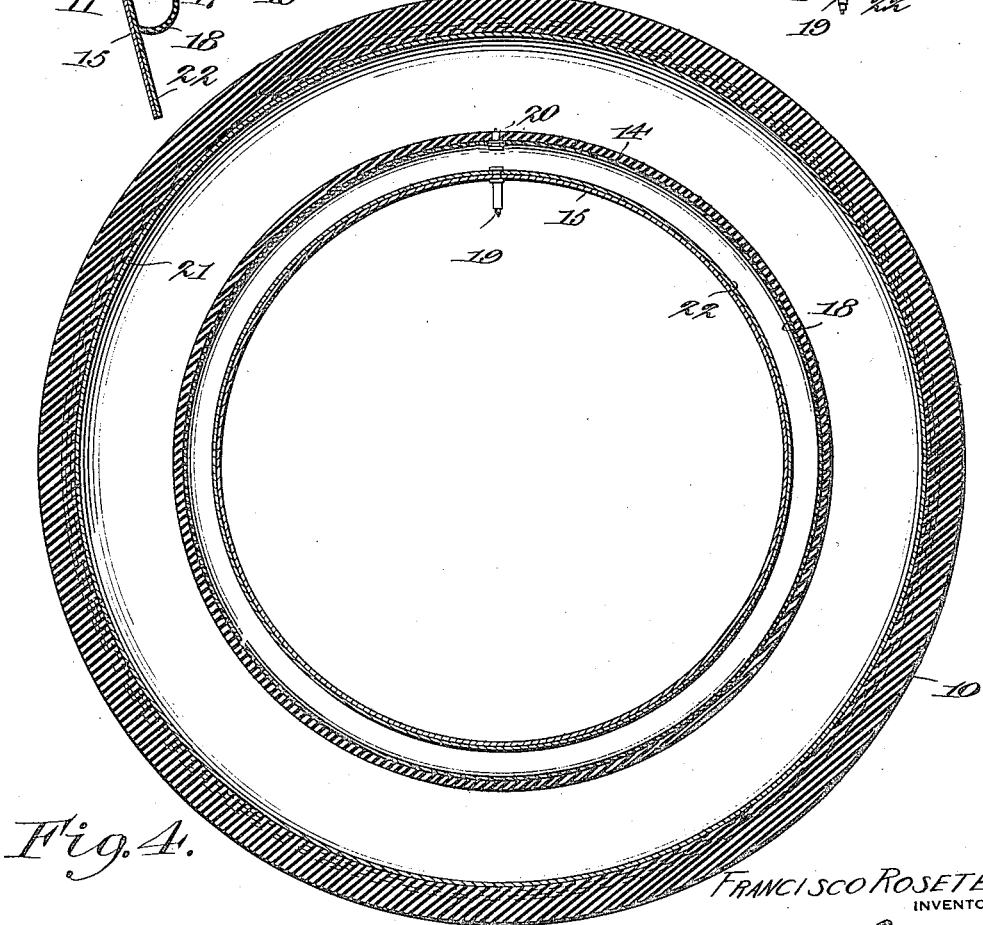
FRANCISCO ROSETE, INVENTOR Patented Feb. 6, 1923. 1,444,706

UNITED STATES PATENT OFFICE.

FRANCISCO ROSETE, OF TULANCINGO, HIDALGO, MEXICO.

SINGLE-TUBE TIRE.

Application filed November 4, 1921. Serial No. 512,897.

*To all whom it may concern:*

Be it known that I, FRANCISCO ROSETE, Mexican, citizen of Pachuca, Hidalgo, residing at Tulancingo, in the county of Tulancingo and State of Hidalgo, Mexico, have invented new and useful Improvements in Single-Tube Tires, of which the following is a specification.

This invention relates to single tube tires, and one of the principal objects of the invention is to produce a device of this nature in which the annular aperture between the rim and the shoe may be closed by an inflatable element containing the valve mechanism for inflating the shoe also.

Another object is to construct a tire of this nature in which shall be placed means for automatically stopping small punctures of the tire.

Another object is to construct a device of this nature which shall be simple of construction, cheap to manufacture, and highly efficient for the purpose for which it is designed.

With these and other objects in view, the invention resides in certain novel construction and arrangement and combination of parts, the essential features of which are hereinafter fully described, are particularly pointed out in the appended claims, and are illustrated in the accompanying drawing, in which:

Figure 1 is a vertical sectional view of the tire with the closure member in non-closing position.

Figure 2 is a similar view with the parts in closed position.

Figure 3 is a similar view on the line of the valve mechanism.

Figure 4 is a section of the tire at right angles to the axis of rotation.

Like characters of reference refer to like parts in all views.

Referring to the drawing in detail, 10 represents the body portion of the tire which is constructed similar to any well known shoe and may be provided with any desired manner of tread surface. The tire 10 is provided with two beads 11 and 12 and with a central annular opening 13 between two inwardly curved flanges 14. A cover member 15 of thick canvas or any other suitable material is secured to the bead 11 and adapted to fold the flap against the bead 12, the latter bead being raised at 16 for this purpose. It will be noted that the elements 15 and 14 define a semi-circular space 17 in which there lies a small inflatable tube 18. A valve 19 permits air to be forced into the tube 18 and a valve 20 is provided with a spring so that when the pressure in tube 18 rises above, a predetermined amount of air may escape therefrom through said valve 20. Valve 20 registers with the groove 13 and a lining of oil cloth or soft rubber or any other suitable material indicated by the numeral 21 covers the entire inner surface of the tube and a similar lining is indicated at 22 on that face of the flap 15 which abuts the bead 12.

In operation the bead 11 is first adjusted to position, flap 15 is brought firmly into the seat 16 and then the bead 12 is placed in the groove of the rim and suitable inflating means is then secured to the valve 19. A tube 18 is first inflated thereby closing up the space 17 and preventing the possibility of egress of air from the main tire 10 through the groove 13. As the pressure increases into the member 18 valve 20 permits escape of air into the main chamber of the tire 10 so as to inflate the latter.

In case of slight punctures the flexible lining 21 will extrude itself into the puncture so as to stop up the same and prevent leakage. Also in case of punctures the lining 21 forms a suitable means for anchoring patches and the like.

The member 15 makes with the seat 16 the principal obturation of the tire and the efficiency of this obturation is increased in proportion with the pressure of the air blown into the tire. This invention is also applicable to detachable tires.

What is claimed is:—

1. A tire of the class described comprising a body portion formed with flanges, a flap secured to one of said flanges and seated against the other of said flanges and a tube secured to said flap as and for the purpose set forth.

2. A tire comprising an annular slot, a movable flap secured adjacent thereto, an inflatable tube adapted to close said slot, and means whereby said tube may be inflated, and means whereby air may be expelled from said tube to the main chamber of said tire, when the pressure in said tube has reached a predetermined point.

In testimony whereof I have affixed my signature.

FRANCISCO ROSETE.